United States Patent
Strock

(10) Patent No.: US 10,294,962 B2
(45) Date of Patent: May 21, 2019

(54) TURBINE ENGINE SEAL FOR HIGH EROSION ENVIRONMENT

(71) Applicant: United Technologies Corporation, Farmington, CT (US)

(72) Inventor: Christopher W. Strock, Kennebunk, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 97 days.

(21) Appl. No.: 15/638,486

(22) Filed: Jun. 30, 2017

(65) Prior Publication Data

US 2019/0003486 A1   Jan. 3, 2019

(51) Int. Cl.
*F04D 29/00* (2006.01)
*F04D 29/52* (2006.01)
(Continued)

(52) U.S. Cl.
CPC .......... *F04D 29/526* (2013.01); *F01D 11/122* (2013.01); *F02C 3/04* (2013.01);
(Continued)

(58) Field of Classification Search
CPC .... F04D 29/526; F04D 29/083; F04D 29/324; F01D 11/112; F02C 7/04; F02C 3/04; F05D 2220/32; F05D 2230/80; F05D 2230/90; F05D 2300/172; F05D 2300/173; F05D 2300/177; F05D 2300/21; F05D 2300/2263

See application file for complete search history.

(56) References Cited

U.S. PATENT DOCUMENTS 5,024,884 A * 6/1991 Otfinoski .................. B22F 3/26
                                              415/174.4
5,064,727 A * 11/1991 Naik ....................... C23C 30/00
                                              415/173.4
(Continued)

FOREIGN PATENT DOCUMENTS

EP       0185603      6/1986
GB       2121884      1/1984
WO       2015050704   4/2015

OTHER PUBLICATIONS

Product Brochure. Thermal Spray Materials Guide. Sulzer Metco. May 2012. pp. 1-52.
(Continued)

*Primary Examiner* — Thomas Moulis
(74) *Attorney, Agent, or Firm* — Carlson, Gaskey & Olds, P.C.

(57) ABSTRACT

A gas turbine engine includes an inlet duct, a compressor section, a combustor section, and a turbine section connected to drive the compressor section. The compressor section includes circumferentially-spaced blades having abrasive blade tips. A seal is disposed radially outwards of the blades. The seal includes a substrate that has a substrate hardness, an abradable layer that has an abradable layer hardness, and a hard interlayer between the substrate and the abradable layer. The hard interlayer has an interlayer hardness that is higher than the abradable layer hardness and higher than the substrate hardness.

20 Claims, 1 Drawing Sheet

(51) Int. Cl.
*F01D 11/12* (2006.01)
*F02C 3/04* (2006.01)
*F02C 7/04* (2006.01)
*F04D 29/08* (2006.01)
*F04D 29/32* (2006.01)

(52) U.S. Cl.
CPC .............. *F02C 7/04* (2013.01); *F04D 29/083* (2013.01); *F04D 29/324* (2013.01); *F05D 2220/32* (2013.01); *F05D 2230/80* (2013.01); *F05D 2230/90* (2013.01); *F05D 2300/172* (2013.01); *F05D 2300/173* (2013.01); *F05D 2300/177* (2013.01); *F05D 2300/21* (2013.01); *F05D 2300/2263* (2013.01); *F05D 2300/6033* (2013.01); *F05D 2300/611* (2013.01)

(56) References Cited

U.S. PATENT DOCUMENTS

| | | | | |
|---|---|---|---|---|
| 5,536,022 | A | 7/1996 | Sileo et al. | |
| 5,780,146 | A * | 7/1998 | Mason | C04B 20/002 |
| | | | | 428/325 |
| 6,358,002 | B1 | 3/2002 | Good et al. | |
| 6,652,227 | B2 | 11/2003 | Fried | |
| 8,017,240 | B2 * | 9/2011 | Strock | C23C 4/02 |
| | | | | 427/154 |
| 8,801,373 | B2 * | 8/2014 | Kojima | C22C 19/00 |
| | | | | 277/415 |
| 8,876,466 | B2 * | 11/2014 | Pattinson | B23K 26/206 |
| | | | | 415/116 |
| 9,016,692 | B2 * | 4/2015 | Haubold | B23K 26/342 |
| | | | | 277/412 |
| 9,169,740 | B2 * | 10/2015 | Strock | F01D 5/06 |
| 9,975,812 | B2 * | 5/2018 | Doesburg | C04B 35/486 |
| 10,036,402 | B2 * | 7/2018 | Amini | F01D 5/28 |
| 2003/0042685 | A1 * | 3/2003 | Sanders | F01D 11/122 |
| | | | | 277/415 |
| 2003/0228483 | A1 * | 12/2003 | Fiala | B22F 3/115 |
| | | | | 428/564 |
| 2008/0138658 | A1 * | 6/2008 | Litton | C23C 14/083 |
| | | | | 428/702 |
| 2009/0123722 | A1 * | 5/2009 | Allen | C23C 30/005 |
| | | | | 428/220 |
| 2010/0050408 | A1 * | 3/2010 | Minor | B23P 6/005 |
| | | | | 29/402.13 |
| 2010/0284797 | A1 * | 11/2010 | Jarrabet | F01D 11/122 |
| | | | | 415/174.4 |
| 2011/0002277 | A1 | 1/2011 | Lewis et al. | |
| 2013/0045091 | A1 * | 2/2013 | Della-Fera | F01D 11/122 |
| | | | | 415/174.4 |
| 2013/0078085 | A1 * | 3/2013 | Strock | F01D 11/122 |
| | | | | 415/173.4 |
| 2013/0108421 | A1 * | 5/2013 | Sinatra | F01D 11/122 |
| | | | | 415/182.1 |
| 2014/0147242 | A1 * | 5/2014 | Ghasripoor | F16J 15/445 |
| | | | | 415/1 |
| 2014/0367920 | A1 | 12/2014 | Konigs et al. | |
| 2015/0233255 | A1 * | 8/2015 | Strock | F01D 5/20 |
| | | | | 60/805 |
| 2015/0267544 | A1 * | 9/2015 | Gurt Santanach | F01D 5/288 |
| | | | | 415/200 |
| 2015/0308281 | A1 * | 10/2015 | Strock | C23C 4/10 |
| | | | | 415/173.4 |
| 2016/0010488 | A1 * | 1/2016 | Albers | F04D 29/563 |
| | | | | 415/148 |
| 2016/0017725 | A1 * | 1/2016 | Bogue | C23C 4/134 |
| | | | | 416/241 R |
| 2016/0084168 | A1 * | 3/2016 | Amini | C23C 1/025 |
| | | | | 415/173.1 |
| 2016/0251976 | A1 * | 9/2016 | Strock | F01D 11/122 |
| | | | | 277/411 |
| 2016/0265367 | A1 | 9/2016 | Rosenzweig et al. | |
| 2016/0290151 | A1 * | 10/2016 | Strock | F01D 11/12 |
| 2016/0312628 | A1 * | 10/2016 | Kirby | C23C 16/56 |
| 2016/0333717 | A1 * | 11/2016 | Strock | F01D 11/122 |
| 2016/0355921 | A1 * | 12/2016 | Beaudoin | C23C 4/134 |
| 2016/0356165 | A1 * | 12/2016 | Strock | C23C 4/06 |
| 2017/0314410 | A1 * | 11/2017 | Liu | F01D 11/122 |
| 2017/0314566 | A1 * | 11/2017 | Strock | F04D 29/164 |
| 2017/0314567 | A1 * | 11/2017 | Hansen | F02C 3/04 |
| 2017/0314570 | A1 * | 11/2017 | Strock | C23C 16/00 |
| 2017/0314571 | A1 * | 11/2017 | Strock | C23C 4/06 |
| 2018/0030993 | A1 * | 2/2018 | Strock | B23P 15/02 |
| 2018/0195176 | A1 * | 7/2018 | Annen | C23C 28/321 |
| 2018/0216478 | A1 * | 8/2018 | Martel | F01D 11/122 |
| 2018/0230842 | A1 * | 8/2018 | Liu | C22C 9/06 |
| 2018/0306047 | A1 * | 10/2018 | Seymour | F01D 11/122 |

OTHER PUBLICATIONS

European Search Report for European Patent Application No. 18179963 completed Nov. 29, 2018.

* cited by examiner

TURBINE ENGINE SEAL FOR HIGH EROSION ENVIRONMENT

STATEMENT REGARDING FEDERALLY SPONSORED RESEARCH OR DEVELOPMENT

This invention was made with government support under contract number #W58RGZ-16-C-0046 awarded by Army Contracting Command—Redstone, Redstone Arsenal, Ala. 35898-5280. The government has certain rights in the invention.

BACKGROUND

Gas turbine engines include a compressor that compresses air, a combustor that ignites the compressed air and a turbine across which the compressed air is expanded. The expansion of the combustion products drives the turbine to rotate, which in turn drives rotation of the compressor.

In order to increase efficiency, a clearance between the tips of the blades in the compressor and the outer diameter of the flowpath is kept sufficiently small. This ensures that a minimum amount of air passes between the tips and the outer diameter. Some engines include an abradable outer air seal to further reduce tip clearance. The tips are designed to, at times, rub against the seal. The rubbing wears the abradable material of the seal. The tips have a reduced tip clearance relative to the idealized geometry formed in the abradable surface, thereby increasing efficiency.

SUMMARY

A gas turbine engine according to an example of the present disclosure includes an inlet duct and a compressor section connected with the inlet duct. The compressor section has a plurality of circumferentially-spaced blades that have abrasive blade tips, a combustor section, a turbine section connected to drive the compressor section, and a seal disposed radially outwards of the blades. The seal includes a substrate that has a substrate hardness, an abradable layer that has an abradable layer hardness, and a hard interlayer between the substrate and the abradable layer. The hard interlayer has an interlayer hardness that is higher than the abradable layer hardness and higher than the substrate hardness.

In a further embodiment of any of the foregoing embodiments, the abradable layer is formed of a metallic alloy.

In a further embodiment of any of the foregoing embodiments, ein the metallic alloy is selected from the group consisting of aluminum alloys, copper alloys, nickel alloys, cobalt alloys, nickel-cobalt alloys, and combinations thereof.

In a further embodiment of any of the foregoing embodiments, the hard interlayer is formed of a metal matrix composite that has a metallic matrix and hard particles dispersed in the metallic matrix.

In a further embodiment of any of the foregoing embodiments, the metallic matrix is formed of a metal selected from the group consisting of nickel, cobalt, nickel chromium, cobalt chromium, and combinations thereof.

In a further embodiment of any of the foregoing embodiments, the hard particles are selected from the group consisting of carbides, oxides, and combinations thereof.

In a further embodiment of any of the foregoing embodiments, the hard particles are selected from the group consisting of tungsten carbide, chromium carbide, and combinations thereof.

In a further embodiment of any of the foregoing embodiments, the abradable layer is formed of a metallic alloy selected from the group consisting of aluminum alloys, copper alloys, nickel alloys, cobalt alloys, nickel-cobalt alloys, and combinations thereof.

In a further embodiment of any of the foregoing embodiments, the compressor section has a maximum diameter to the blade tips of 23 centimeters.

In a further embodiment of any of the foregoing embodiments, the compressor section has a number of compressor stages that is no more than three, and the turbine section has a number of turbine stages that is no more than two.

In a further embodiment of any of the foregoing embodiments, the inlet duct opens radially with respect to a central rotational axis of the compressor section.

A seal for a gas turbine engine according to an example of the present disclosure includes a substrate that has a substrate hardness, an abradable layer that has an abradable layer hardness, and a hard interlayer between the substrate and the abradable layer. The hard interlayer has an interlayer hardness that is higher than the abradable layer hardness and higher than the substrate hardness.

In a further embodiment of any of the foregoing embodiments, the hard interlayer is formed of a metal matrix composite that has a metallic matrix and hard particles dispersed in the metallic matrix, and the metallic matrix is formed of a metal selected from the group consisting of nickel, cobalt, nickel chromium, cobalt chromium, and combinations thereof.

In a further embodiment of any of the foregoing embodiments, the hard particles are selected from the group consisting of carbides, oxides, and combinations thereof.

In a further embodiment of any of the foregoing embodiments, the hard particles are selected from the group consisting of tungsten carbide, chromium carbide, and combinations thereof.

In a further embodiment of any of the foregoing embodiments, the abradable layer is formed of a metallic alloy selected from the group consisting of aluminum alloys, copper alloys, nickel alloys, cobalt alloys, nickel-cobalt alloys, and combinations thereof.

A method for repairing a seal of gas turbine engine according to an example of the present disclosure includes subjecting a seal to a stripping process. The seal has a substrate that has a substrate hardness, an abradable layer that has an abradable layer hardness, and a hard interlayer between the substrate and the abradable layer. The hard interlayer has an interlayer hardness that is higher than the abradable layer hardness and higher than the substrate hardness. The stripping process removes the abradable layer and leaves intact the hard interlayer on the substrate, and deposits a new abradable layer on the hard interlayer to form a refurbished seal.

In a further embodiment of any of the foregoing embodiments, the stripping process includes chemical stripping.

In a further embodiment of any of the foregoing embodiments, the stripping process includes mechanical stripping.

A further embodiment of any of the foregoing embodiments includes removing the seal from a gas turbine engine, and assembling the refurbished seal into the same or different gas turbine engine.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
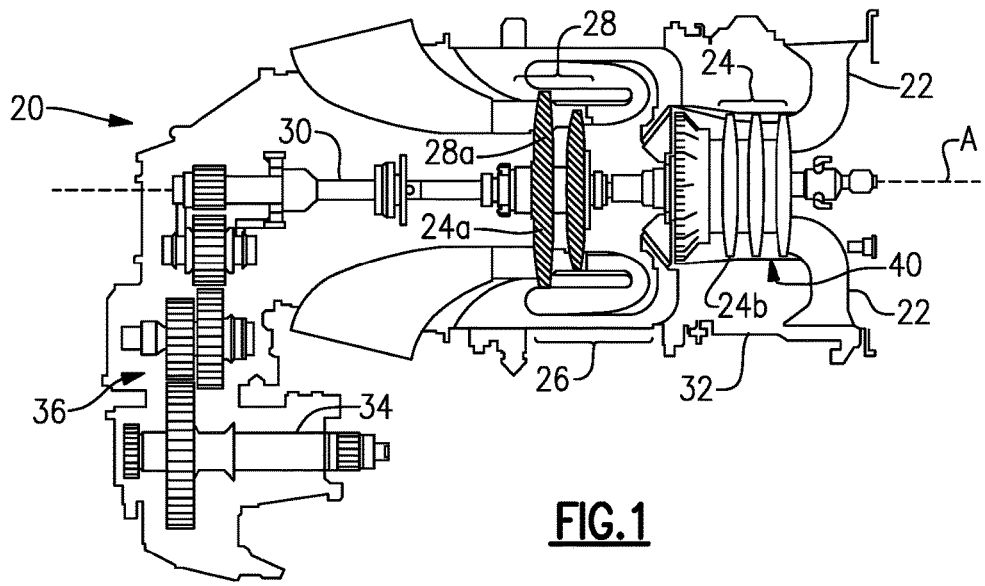
FIG. 1 illustrates an example gas turbine engine.

FIG. 1 schematically illustrates a gas turbine engine 20. In this example, the engine 20 is a turboshaft engine, such as for a helicopter. The engine 20 includes an inlet duct 22, a compressor section 24, a combustor section 26, and a turbine section 28.

The compressor section 24 is an axial compressor and includes a plurality of circumferentially-spaced blades 24a. In this example, the compressor section 24 includes three stages of blades 24a and the maximum diameter to tips 24b of the blades 24s is 23 centimeters. Similarly, the turbine section 28 includes circumferentially-spaced turbine blades 28a. Here, the turbine section 28 has two stages. The relatively low number of stages—here, three in the compressor section 24 and two in the turbine section 28—differs from the higher numbers of stages typically found in turbofan engines, which are designed to drive propulsor fans.

The compressor section 24 and the turbine section 28 are mounted on a main shaft 30 for rotation about an engine central longitudinal axis A relative to an engine static structure 32 via several bearing systems (not shown). The main shaft 30 drives an output shaft 34 through a gearbox 36.

During operation, the compressor section 24 draws air through the inlet duct 22. In this example, the inlet duct 22 opens radially relative to the central longitudinal axis A. The compressor section 24 compresses the air, and the compressed air is then mixed with fuel and burned in the combustor section 26 to form a high pressure, hot gas stream. The hot gas stream is expanded in the turbine section 28, which rotationally drives the main shaft 30, compressor section 28, gearbox 36, and output shaft 34. Although not shown, the main shaft 30 may also drive a generator or other accessories through an accessory gearbox.

The engine 20 also includes a seal system 40 in the compressor section 24 around the blades 24a. Such a seal system may be referred to as a blade outer air seal. The seal system 40 serves to provide a minimum clearance around the tips 24b of the blades 24a, to limit the amount of air that escapes around the tips 24b.

Although turbofan engines ingest some amount of dust, such engines are typically not designed for highly dusty environments. Engines such as the engine 20 are subject to operating in highly dusty environments during takeoff and landing. In such an environment, a compressor section can be subject to unusually high erosion conditions from the dust. The erosion conditions have potential to rapidly erode seals, particularly abradable outer air seals, which would increase the gap at the tips of the blades. The efficiency and stability of small diameter engines, such as those of the size of engine 20, are especially sensitive to the tip gap. While this could be circumvented by avoiding use of abradable outer air seals, the consequence would be a large tip gap that reduces efficiency even at engine cruise. As will be discussed below, the seal system 40 is abradable, yet also limits the effect of erosion.

Figures 2, 3:
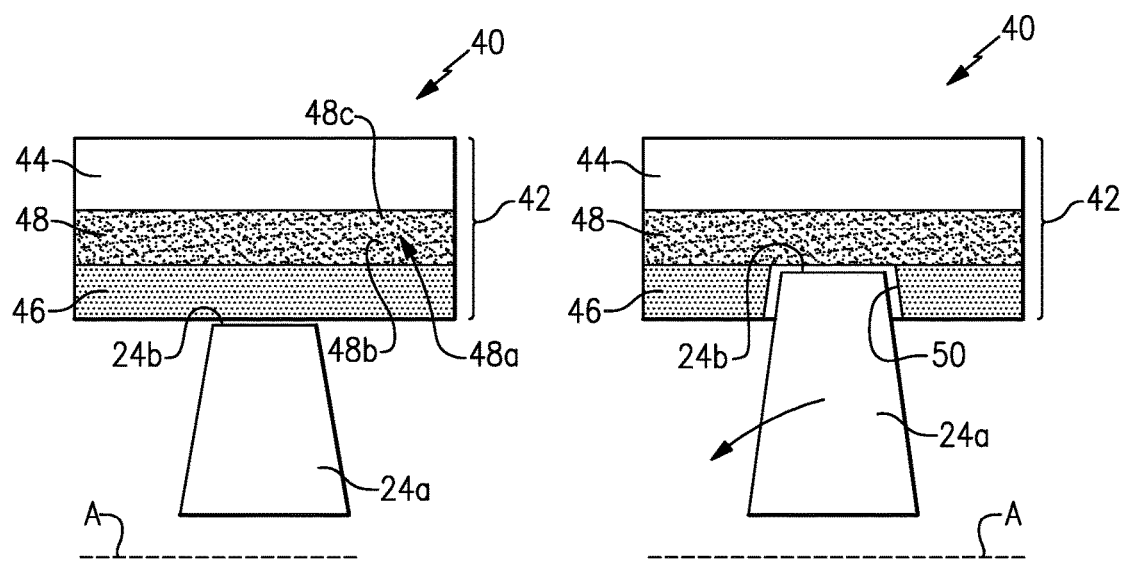
FIG. 2 illustrates an example of a seal for the gas turbine engine.
FIG. 3 illustrates the seal after rubbing with compressor blades.

FIG. 2 illustrates a representative portion of a seal 42 of the seal system 40. As will be appreciated, the seal 42 may be an arc segment, a full ring, a split ring that is mounted around the blades 24a in similar fashion as known blade outer air seals, or an integration into an engine casing. The seal 42 includes a substrate 44, an abradable layer 46, and a hard interlayer 48. The hard interlayer 48 resists erosion. The abradable layer 46 fills the gap between the blade tips 24b during normal operation and the most extreme radially outboard allowed (or occurring) blade tip position. These values will vary depending on design.

In this example, the hard interlayer 48 is in contact with the substrate 44 and the abradable layer 46. The substrate 44 has a substrate hardness, the abradable layer 46 has an abradable layer hardness, and the hard interlayer has an interlayer hardness. The interlayer hardness is higher than the substrate hardness and higher than the abradable layer hardness. For example, the interlayer 48 hardness is more than about 20% harder than the substrate 44. In further examples, the interlayer hardness is over 600 Vickers Hardness (HV), preferably over 750 Vickers Hardness, and most preferably over 1000 HV.

The effect of these hardnesses is that the hard interlayer 48 has a higher erosion resistance than the substrate 44 and the abradable layer 46. Higher erosion resistance can be erosion resistance under the conditions found during operation of the engine 20. These conditions can be simulated or estimated using comparative erosion testing.

The tips 24b of the blades 24a are abrasive with regard to the abradable layer 46. When two components are in rubbing contact, at least at times, one of the components may wear. The term "abradable" refers to the one of the two components that wears, while the other component is "abrasive" and does not wear or wears less. Thus, when the tips 24b of the blades 24a rub against the abradable layer 46, the abradable layer 46 wears, whereas the tips 24b will not wear or will wear less. The word "abrasive" thus also implies that there is or can be contact with an abradable component. The tips 24b of the blades 24 may include an abrasive coating or abrasive element, or may be formed of a material that is abrasive to the abradable layer 46.

Referring to FIG. 3, at times during rotation of the blades 24a the tips 24b may rub against the abradable layer 46 and wear a groove or trench 50 into the abradable layer 46. The trench 50 reduces tip clearance and thus facilitates efficient engine operation. The abradable layer 46 is also subject to erosion and, over time or with severe erosion events, may erode away. The eroding away of the abradable layer 46 may progressively open the tip gap. However, once eroded away, the hard interlayer 48 serves as a "stop" for further erosion. The hard interlayer 48 thus limits the effect of erosion on opening of the tip gap to preserve at least a minimum tip clearance even when the abradable layer 46 is lost. Additionally, the hard interlayer 48 protects the substrate 44 from erosion and may serve as a bond layer to enhance adhesion of the abradable layer 46 to the substrate 44.

The hard interlayer 48 is formed of a metal matrix composite ("MMC") 48a, which is shown in FIG. 2. The MMC 48a includes a metallic matrix 48b (white area) and hard particles 48c (dark areas) dispersed through the metal matrix 48b. In one example, the metallic matrix 48b is formed of nickel, cobalt, nickel chromium, cobalt chromium, or combinations thereof, and the hard particles are carbides, oxides, borides or combinations thereof. One boride example includes chromium boride ($CrB_2$).

In further examples, the metallic matrix 48b is a cobalt- or nickel-based alloy with molybdenum, chromium, aluminum, silicon and low carbon content. Examples include alloy grades available as TRIBALLOY® (E. I. du Pont de Nemours and Company). In further examples, the hard particles include tungsten carbide, chromium carbide, or combinations thereof. Several additional examples include (matrix/particles) cobalt/tungsten carbide, nickel-chromium/chromium carbide ($Cr_3C_2$), cobalt/chromium carbide ($Cr_3C_2$), nickel-chromium/tungsten carbide, niobium/chromium diboride ($CrB_2$), Triballoy® T800/alumina-40titania. In one further example, the hard particles have a composition, by weight, of 38.5-43.5% Cr, 10-13% Ni, 2.9-4.1% Co, 7.7-8.5% C, less than 0.5 Fe, and a balance W (available from Oerlikon Metco as Woka 7500 series). In further examples, the desired hardness may be achieved without hard particles if a hard alloy is used. The alloy grades available as TRIBALLOY® (E. I. du Pont de Nemours and Company) are examples of hard alloys that may be used without hard particles.

The abradable layer 46 is formed of a metallic alloy. For example, the metallic alloy is an aluminum alloy, copper alloy, nickel alloy, cobalt alloy, nickel-cobalt alloy, or combinations thereof. The abradable layer 46 may be porous and/or may have a dispersed internal solid lubricant. The metallic alloy of the abradable layer 46 may also include a corrosion inhibitor. Especially if porous, moisture can infiltrate and increase the potential for corrosion. The corrosion inhibitor may include, but is not limited to, anodic corrosion inhibitors, such as zinc molybdate, and cathodic corrosion inhibitors such as cerium citrate. Another example corrosion inhibitor may include trivalent chromate coatings or treatments, such as grades TCP-HF and TCP-NP available as CHEMEON® (Chemeon Surface Technology, LLC).

In one further example, the abradable layer 46 is formed of an aluminum alloy and the aluminum alloy has a composition, by weight, of about 88% aluminum and about 12% silicon. In another example, the abradable layer 46 is formed of an intermetallic copper alloy. For instance, the intermetallic copper alloy is $Cu_5Al$, $Cu_8AlFe$, or $Cu_{38}Ni$. Further examples may include, by weight, up to 67% nickel, copper as the next most abundant element, and alloy elements of iron, manganese, carbon, aluminum and silicon. Another example copper alloy includes, by weight, at least 35% of copper, 30-45% combined of nickel, cobalt, and iron, with combined iron and cobalt at most one-third of the nickel, 2-8% aluminum, and 5-15% chromium. Any of these examples may also include a solid lubricant, such as hexagonal boron nitride or polymer fillers, and/or fugitive pore formers such as polyester and methyl methacrylate.

The seal 42 is also repairable, which is likely not a characteristic of other seals that would be subjected to severe erosion conditions. For example, since the hard interlayer 48 stops erosion, even if the abradable layer 46 erodes away, the substrate 44 remains intact and can be reused. In contrast, for a seal that is not configured for such erosion conditions, erosion is likely to occur down to the substrate, thereby rendering repair impossible or at least uneconomical.

Figure 4:
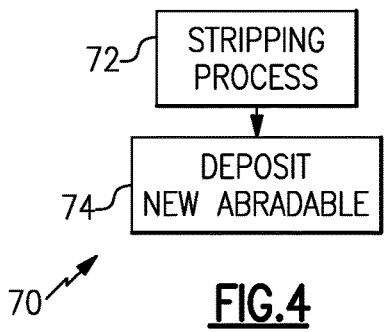
FIG. 4 illustrates an example method of repairing a seal.

FIG. 4 illustrates an example 70 method for repairing the seal 42. The method 70 includes a stripping step 72 and a deposition step 74. The stripping step 72 involves subjecting the seal 42 to a stripping process that removes the abradable layer 46 and the hard interlayer 48 from the substrate 44. The stripping process is not harmful to the substrate 44. As an example, the stripping process may include water jet stripping, chemical stripping (e.g., with an acid), mechanical stripping (e.g., with an abrasive media), or a combination of these.

Following the stripping step 72, a new hard interlayer 48 and new abradable layer 46 is deposited in the deposition step 74, to form a refurbished seal. The refurbished seal will appear substantially similar to the seal 42, shown in FIG. 2. As examples, the abradable layer 46 can be deposited by plasma spray, high velocity oxy-fuel deposition, or other spray or deposition techniques known for application of abradable materials.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine comprising:
    an inlet duct and a compressor section connected with the inlet duct, the compressor section including a plurality of circumferentially-spaced blades having abrasive blade tips;
    a combustor section;
    a turbine section connected to drive the compressor section;
    a seal disposed radially outwards of the blades, the seal including
        a substrate having a substrate hardness,
        an abradable layer having an abradable layer hardness, and
        a hard interlayer between the substrate and the abradable layer, the hard interlayer having an interlayer hardness that is higher than the abradable layer hardness and higher than the substrate hardness.

2. The gas turbine engine as recited in claim 1, wherein the abradable layer is formed of a metallic alloy.

3. The gas turbine engine as recited in claim 2, wherein the metallic alloy is selected from the group consisting of aluminum alloys, copper alloys, nickel alloys, cobalt alloys, nickel-cobalt alloys, and combinations thereof.

4. The gas turbine engine as recited in claim 1, wherein the hard interlayer is formed of a metal matrix composite having a metallic matrix and hard particles dispersed in the metallic matrix.

5. The gas turbine engine as recited in claim 4, wherein the metallic matrix is formed of a metal selected from the group consisting of nickel, cobalt, nickel chromium, cobalt chromium, and combinations thereof.

6. The gas turbine engine as recited in claim 5, wherein the hard particles are selected from the group consisting of carbides, oxides, and combinations thereof.

7. The gas turbine engine as recited in claim 5, wherein the hard particles are selected from the group consisting of tungsten carbide, chromium carbide, and combinations thereof.

8. The gas turbine engine as recited in claim 7, wherein the abradable layer is formed of a metallic alloy selected from the group consisting of aluminum alloys, copper alloys, nickel alloys, cobalt alloys, nickel-cobalt alloys, and combinations thereof.

9. The gas turbine engine as recited in claim 1, wherein the compressor section has a maximum diameter to the blade tips of 23 centimeters.

10. The gas turbine section as recited in claim 9, wherein the compressor section has a number of compressor stages that is no more than three, and the turbine section has a number of turbine stages that is no more than two.

11. The gas turbine section as recited in claim 9, wherein the inlet duct opens radially with respect to a central rotational axis of the compressor section.

12. A seal for a gas turbine engine, comprising:
    a substrate having a substrate hardness;
    an abradable layer having an abradable layer hardness; and
    a hard interlayer between the substrate and the abradable layer, the hard interlayer having an interlayer hardness that is higher than the abradable layer hardness and higher than the substrate hardness.

13. The seal as recited in claim 12, wherein the hard interlayer is formed of a metal matrix composite having a metallic matrix and hard particles dispersed in the metallic matrix, and the metallic matrix is formed of a metal selected from the group consisting of nickel, cobalt, nickel chromium, cobalt chromium, and combinations thereof.

14. The seal as recited in claim 13, wherein the hard particles are selected from the group consisting of carbides, oxides, and combinations thereof.

15. The seal as recited in claim 13, wherein the hard particles are selected from the group consisting of tungsten carbide, chromium carbide, and combinations thereof.

16. The seal as recited in claim 13, wherein the abradable layer is formed of a metallic alloy selected from the group consisting of aluminum alloys, copper alloys, nickel alloys, cobalt alloys, nickel-cobalt alloys, and combinations thereof.

17. A method for repairing a seal of gas turbine engine, the method comprising:
    subjecting a seal to a stripping process, the seal having
        a substrate that has a substrate hardness,
        an abradable layer having an abradable layer hardness, and
        a hard interlayer between the substrate and the abradable layer, the hard interlayer having an interlayer hardness that is higher than the abradable layer hardness and higher than the substrate hardness,
    wherein the stripping process removes the abradable layer and leaves intact the hard interlayer on the substrate; and
    depositing a new abradable layer on the hard interlayer to form a refurbished seal.

18. The method as recited in claim 17, wherein the stripping process includes chemical stripping.

19. The method as recited in claim 17, wherein the stripping process includes mechanical stripping.

20. The method as recited in claim 17, including removing the seal from a gas turbine engine, and assembling the refurbished seal into the same or different gas turbine engine.

\* \* \* \* \*